United States Patent [19]

Gonzalez-Lopez et al.

[11] Patent Number: 5,265,198

[45] Date of Patent: Nov. 23, 1993

[54] METHOD AND PROCESSOR FOR DRAWING 'POLYGON WITH EDGE'-TYPE PRIMITIVES IN A COMPUTER GRAPHICS DISPLAY SYSTEM

[75] Inventors: Jorge Gonzalez-Lopez, Red Hook; Thomas P. Lanzoni, Lake Katrine, both of N.Y.

[73] Assignee: International Business Machines Corporation, Armonk, N.Y.

[21] Appl. No.: 425,784

[22] Filed: Oct. 23, 1989

[51] Int. Cl.$^5$ .................. G06F 15/72; G09G 1/06
[52] U.S. Cl. .................. 395/122; 395/121; 395/128
[58] Field of Search ............ 364/521, 518, 522; 340/747, 750, 729, 723, 728, 721; 358/104; 395/140, 141, 142, 143, 121, 122, 123, 128, 129

[56] References Cited

U.S. PATENT DOCUMENTS

| | | | |
|---|---|---|---|
| 4,586,038 | 4/1986 | Sims et al. | 340/729 |
| 4,626,838 | 12/1986 | Tsujioka et al. | 340/744 |
| 4,783,832 | 11/1988 | Kaneko | 382/41 |
| 4,849,906 | 7/1989 | Chodos et al. | 364/516 |
| 4,855,938 | 8/1989 | Gonzalez-Lopez et al. | 364/521 |
| 4,901,251 | 2/1990 | Sfarti | 364/521 |
| 4,918,626 | 4/1990 | Watkins et al. | 364/522 |
| 4,945,500 | 7/1990 | Deering | 364/522 |
| 4,951,232 | 8/1990 | Hannah | 364/522 |
| 4,962,468 | 10/1990 | Beauregard et al. | 364/521 |
| 4,979,130 | 12/1990 | Li et al. | 364/518 |
| 5,001,470 | 3/1991 | Bandai | 340/729 |
| 5,043,921 | 8/1991 | Gonzalez-Lopez et al. | 364/522 |
| 5,088,054 | 2/1992 | Paris, II | 395/121 |

FOREIGN PATENT DOCUMENTS 0323558 7/1989 European Pat. Off. .
0240246 10/1989 European Pat. Off. .
3636338 4/1987 Fed. Rep. of Germany .

OTHER PUBLICATIONS

Fundamentals of Interactive Computer Graphics, Foley & Van Dam, pp. 456-461, 575-591.
R. W. Swanson and L. J. Thayer, "A fast shaded-polygon renderer", ACM Computer Graphics, vol. 20, No. 4, pp. 95-101, Aug. 1986.
IBM Technical Disclosure Bulletin, vol. 27, No. 12, May 1985 "Graphics Area Fill Algorithm", pp. 6994-6996.

Primary Examiner—Phu K. Nguyen
Attorney, Agent, or Firm—Mark S. Walker; William A. Kinnaman

[57] ABSTRACT

In a computer graphics display system, a method and processor are disclosed for drawing a 'polygon with edge'-type primitive encountered in certain high level graphics interface programs. Both the method and processor use a mask buffer organized into a plurality of addressable constituent pixels, each pixel preferably being two bits deep. The method includes: masking the pixels in the mask buffer corresponding to the boundary to the polygon; drawing the pixels in the frame buffer of the display system corresponding to the boundary of the polygon; and drawing the pixels in the frame buffer corresponding to the interior of the polygon with reference to the content of the mask buffer. Corresponding processing steps for writing Z values in a depth buffer are also described. In addition, specific algorithms for implementing the method are set forth, along with an embodiment of a display processor implementing the method.

10 Claims, 4 Drawing Sheets

METHOD AND PROCESSOR FOR DRAWING 'POLYGON WITH EDGE'-TYPE PRIMITIVES IN A COMPUTER GRAPHICS DISPLAY SYSTEM

BACKGROUND OF THE INVENTION

1. Technical Field

This invention relates in general to computer graphics display systems which include graphics display means having a frame buffer for storing individual pixels for each of plurality of lines to be displayed on a display monitor. More particularly, the invention comprises an improved method and processor for drawing in the frame buffer 'polygon with edge'-type primitives encountered in certain high level graphics interface programs.

2. Description of the Prior Art

'Polygon with data'-type primitives are encountered in graphics interfaces such as GRAPHIGS, marketed by IBM, and PHIGS PLUS created by ISO and described in: "Information Processing Systems—Computer Graphics—Programmer Hierarchal Interactive Graphics System (PHIGS), Part IV—Plus Lumiere and Surfaces (PHIGS PLUS)" ISO Document No. SC24N224, Rev. #3 (July, 1989). A 'polygon with edge'-type primitive is defined herein as a 'polygon with data'-type primitive with a boundary edge that can be of different color than that of its interior. In addition, the edge may be stylized (i.e., dotted, dashed, etc.) and the polygon can be shaded, lighting applying to interior points only. Further, depth-cueing can be specified and line and hidden surface removal is allowed. Existing techniques for processing 'polygons with edge'-type primitives are relatively complex in implementation and time consuming in operation. For example, one approach is to interpolate all edges of the polygon and then interpolate individual lines of the polygon.

In drawing graphics primitives, it is often advantageous from a cost-performance viewpoint to rely on a set of hardwired, basic primitives wherein all other primitives can be decomposed into elements of such a basic primitive set. An example of a basic set is one consisting of only vectors and triangles. With 'polygon with edge'-type primitives, applicant has recognized that edges can be advantageously handled by a vector generator and interior points by a triangle generator (i.e., once the polygon has been tessellated into triangles).

An initial difficulty encountered with this approach, however, is that interior points of one triangle may obscure edge points of the polygon. For example, in FIG. 1, the polygon defined by vertices 1,2,3,4 has been tessellated into triangles 1,2,3 and 1,3,4. Note that points Pa,Pb belong to edge 2,3 of triangle 1,2,3 but they are interior points of triangle 1,3,4 as well. If triangle 1,2,3 is processed first and if the orientation of the quadrilateral 1,2,3,4 is such that the interior points (Pa and Pb of triangle 1,3,4) are closer to the viewer than the edge points (Pa and Pb of triangle 1,2,3) then the interior points will obscure the edge points which results in edge discontinuity, an annoying visual effect.

In addition, it is often desirable to emphasize a certain region of a displayed object by highlighting a superimposed polygonal line (perhaps styled) outlining it. Such a line may span several polygons and each segment of the line must correspond to an edge and be coincident with it. In other words, the line and the edge must have the same X,Y, and Z values so that the conventional Z-buffer algorithm will make a point of the line visible if its corresponding point on the edge is also visible. This condition is not guaranteed if some interior points of a polygon obscure edge points of the same polygon because the points may receive a different Z value.

Thus, the present invention solves the above noted problems and provides a shading technique for 'polygon with edge'-type primitives which advantageously uses many hardware elements standard in typical graphics display systems.

SUMMARY OF THE INVENTION

Briefly described, in a computer graphics display system having a display processor and display means including a frame buffer for storing individual pixels for each of a plurality of lines to be displayed on the display monitor, this invention presents in one aspect an improved method for drawing a 'polygon with edge'-type primitive in the frame buffer. The frame buffer is typically organized into an $M \times N$ plurality of addressable consituent pixels and the method uses a mask buffer similarly organized into an $M \times N$ plurality of addressable constituent pixels. In a preferred embodiment, each pixel of the mask buffer is two bits deep. The method comprises the steps of: masking the pixels in the mask buffer corresponding to the boundary of the polygon; drawing the pixels in the frame buffer corresponding to the boundary of polygon; and drawing the pixels in the frame buffer corresponding to the interior of the polygon with reference to the content of the mask buffer. In a further embodiment, the display processor may include a depth buffer, which is also organized into an $M \times N$ plurality of addressable constituent pixels for storing Z values of individual pixels, and the method includes the steps of: storing Z values in the depth buffer of pixels corresponding to the boundary of the polygon; and storing Z values in the depth buffer of pixels corresponding to the interior of the polygon with reference to the content of the mask buffer. Specific algorithms for implementing the masking, drawing and storing steps are provided.

In an alternate embodiment, the invention consists of a display processor which implements the described method. The processor includes: a controller; an X-Y generator having an edge generation mode and a triangle generation mode; interpolating means configured to receive signals from the controller and the X-Y generator and output interpolated values of Z for each X,Y address; and mask buffer and depth buffer means including a mask buffer having an $M \times N$ plurality of addressable constituent pixels, which are each two bits deep, and a depth buffer organized into an $M \times N$ plurality of addressable constituent pixels. The mask buffer and depth buffer means includes combinational logic for generating an accurate mask of the polygon boundary in the mask buffer, wherein the mask is used to control storing of interpolated Z values to the depth buffer and intensity for each X,Y address to the frame buffer.

Accordingly, a principal object of the present invention is to provide a method and processor for drawing a 'polygon with edge'-type primitive in a frame buffer of a graphics display means using a basic set of hardwired primitives.

Another object of the present invention is to provide such a method and process which in implementation avoid the creation of discontinuous polygon edges from any viewing orientation.

Yet another object of the present invention is to provide such a method and processor with improved cost-performance characteristics over existing techniques for processing 'polygon with edge'-type primitives.

BRIEF DESCRIPTION OF THE DRAWINGS

These and other objects, advantages and features of the present invention will be more readily understood from the following detailed description of certain embodiments of the present invention, when considered in conjunction with the accompanying drawings in which.

DETAILED DESCRIPTION OF THE INVENTION

As briefly stated above, this invention presents an improved method and processor for drawing (i.e., filling or shading) a 'polygon with edge'-type primitive given its coordinates and their corresponding intensities (i.e., principally color, e.g., using a red, green, and blue color system (RGB)) at its vertices. The boundary and interior colors of the 'polygon with edge' can be different by definition. Further, in an enhanced embodiment, the line describing the polygon boundary can be styled, for example, dotted, dashed, etc.

Figure 2:
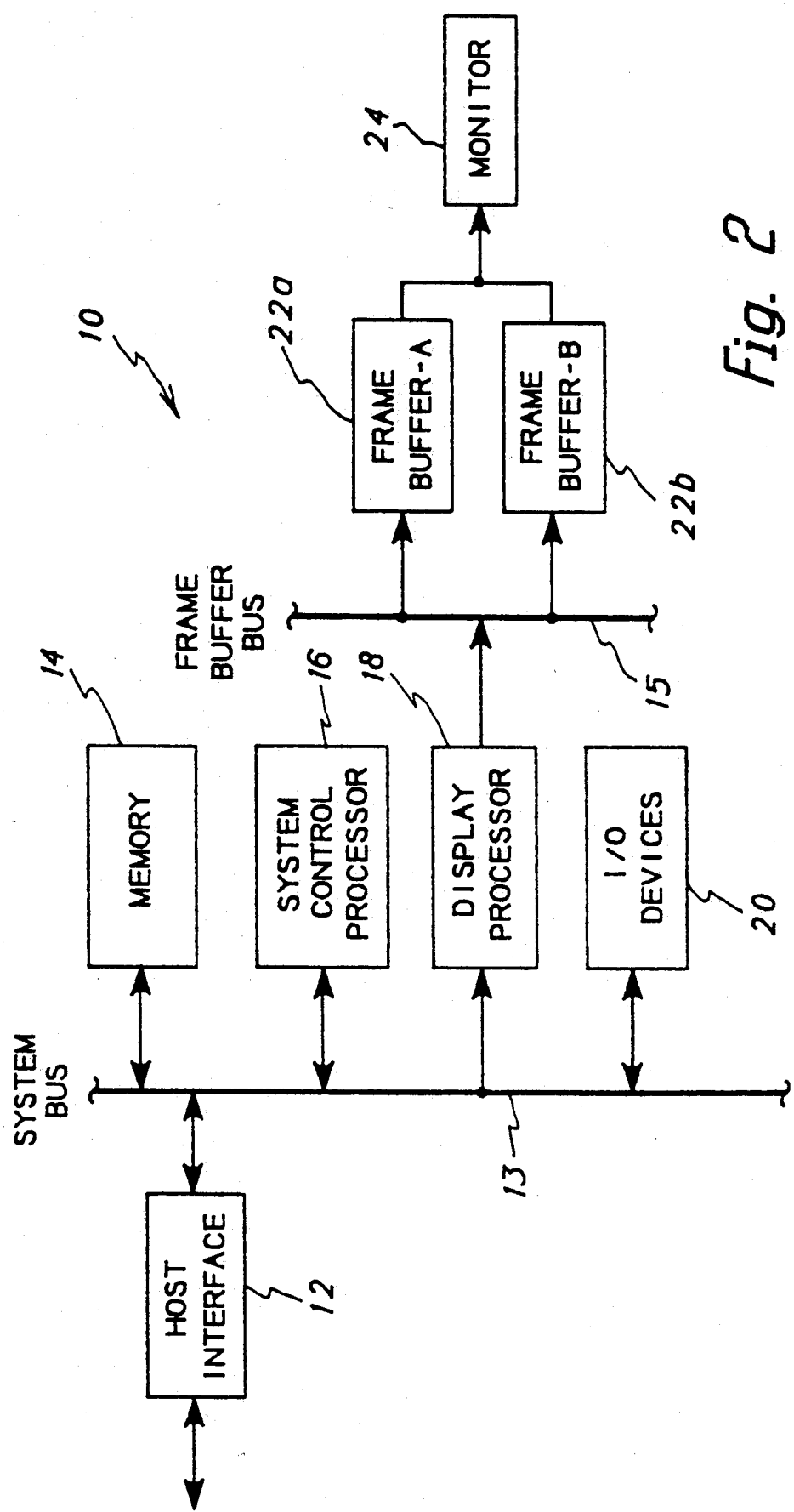
FIG. 2 is a general block diagram representation of a computer graphics display system incorporating the present invention.

Referring first to FIG. 2, several major components of a raster graphics display system, generally denoted 10, are illustrated. System 10 includes host interface 12, system memory 14, system control processor 16, display processor 18, input/output devices 20, two frame buffers 22a & 22b and monitor 24. Each of these components can be implemented by elements of commercially available computer graphics display systems such as the IBM 5080. Briefly described, memory 14, processors 16 & 18 and I/O devices 20 communicate with each other through a system bus 13 and with a host computer (not shown) through serial host interface 12. System control processor 16 is a general purpose processor that has master control of graphics system 10. Processor 16 is responsible for servicing all attached graphics input-/output devices 20, coordinating the associated processing with display processor 18 and interfacing with the host computer via interface 12. Display processor 18 is responsible for executing graphics orders in a display program residing in system memory 14 and is concerned primarily with the generation of the image that will appear on display monitor 24. Display processor 18 functions in part to prepare geometric primitives, such as polygons and polylines, representative of an object to be displayed on monitor 24. The display processor reads basic primitives from memory 14 through system bus 13, interprets them and generates the desired picture elements in frame buffer-A 22a and frame buffer-B 22b by a frame buffer bus 15. The frame buffers are usually dual, which allows for one buffer to be written by the drawing processor while the other is displayed by the monitor. The methods and systems comprising the present invention are principally implemented within display processor 18 of system 10.

Figure 3:
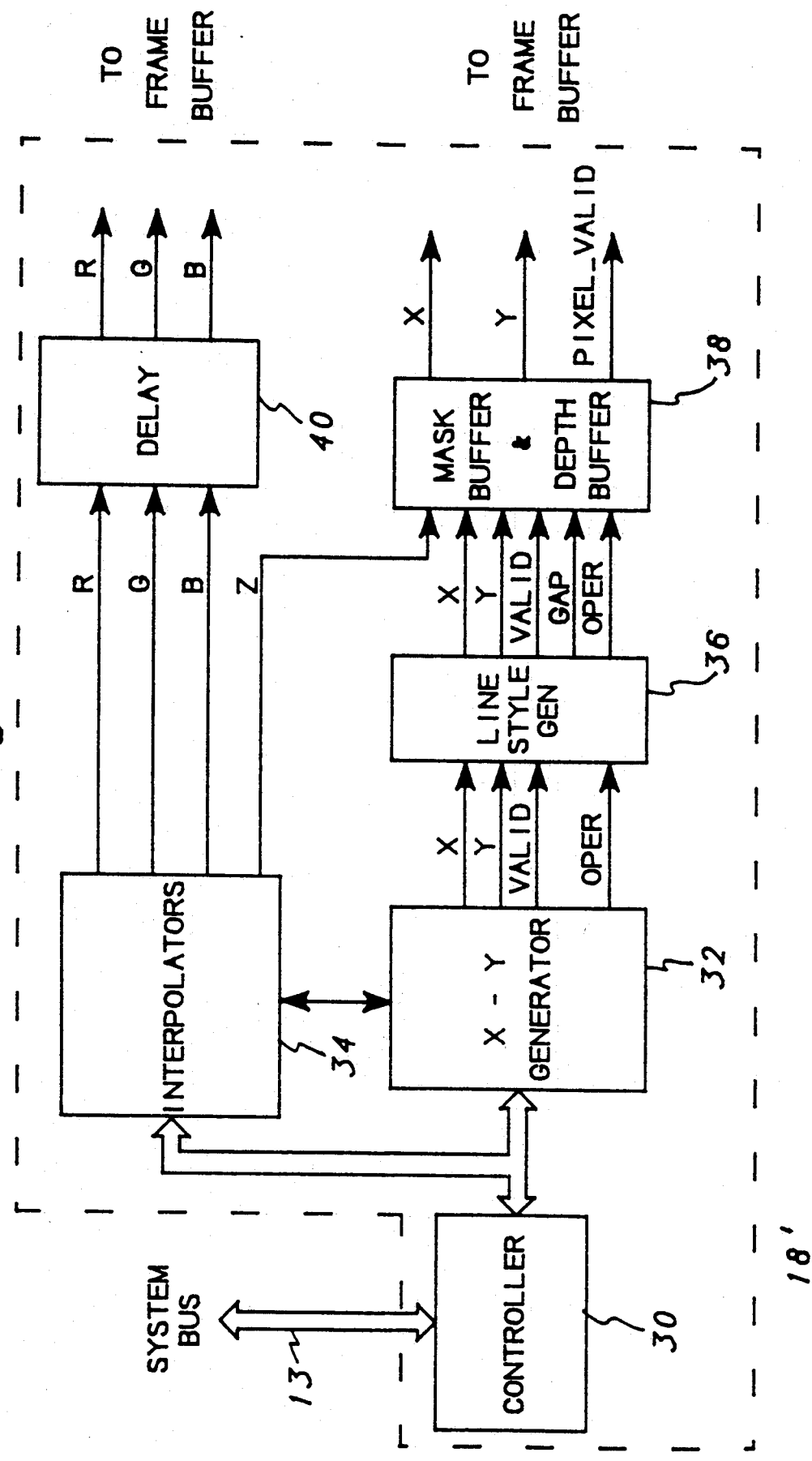
FIG. 3 is a block diagram representation of one embodiment of the display processor of the present invention.

One embodiment of the invention, configured for shading a polygon using a standard hardwired X-Y generator and interpolators, is depicted in FIG. 3. As shown, display processor 18 communicates with the display system through system bus 13. Processor 18 includes controller 30, X-Y generator 32, interpolators 34, line style generator 36, mask & depth buffers and their associated combinational logic circuits, 38, and delay circuitry 40. With the exception of the mask buffer and supporting logic in unit 38, each of these components consists of commercially available elements of computer graphic display systems. Controller 30 comprises a microprocessor that reads and interprets the order list stored in system memory and computes the required geometrical transformations as well as other operations such as clipping, lighting, and depth-cueing. Controller 30 communicates with the rendering pipeline composed of X-Y generator 32, interpolators 34, line style generator 36, and logic circuitry of mask buffer and depth buffer unit 38. For each polygon primitive, and each vertex thereof, the positions (X,Y,Z), interior colors (e.g., R,G,B) and edge colors (R,G,B) are made available to the rendering pipeline.

Generator 32 generates a sequence of X and Y coordinates corresponding to two possible modes of operation: (1) vector generation mode; and (2) triangle generation mode. In vector generation mode, generator 32 implements a vector generation algorithm, such as the well known Bresenham's algorithm, given the coordinates of two end points of the vector. The algorithm provides a sequence of X,Y coordinates in screen space that best approximates a geometrical straight line.

In triangle generation mode, generator 32 receives X and Y coordinates of the vertices of a triangle and generates a sequence of addresses of the pixels definitive of the triangle. (Where the vertices of a polygon having four or more sides are to be processed, the vertices are preferably processed in the open art in combinations of three at a time in a methodical sequence so that the system is processing triangles rather than complex polygons.) X-Y generator 32 provides control signals to interpolators 34 as well as a pixel validation signal (VALID) to line style generator 36. Signal OPER, output from generator 32 and controlled by controller 30, distributes control information to the different pieces of logic in the rendering pipeline, such as line style selection activation, control of the depth buffer, etc.

Interpolators 34 also have two operating modes: vector mode and triangle mode. Interpolators 34 generate in a well known manner interpolated values of Z and R,G & B (the color primaries) for points of a vector (if in vector generation mode) from the corresponding values at the end points, or interpolated values of the points of the triangle (if in triangle generation mode) from the corresponding values at the vertices. In vector mode, interpolators 34 may implement a method such as that described in an article entitled, "Incremental Linear Interpolation," by D. Field, ACM Transactions on Graphics, Volume 4, No. 1, (January 1985). In triangle mode, a method such as that disclosed by Liang and Gonzalez in U.S. Pat. No. 4,805,116 entitled, "Interpolated Display Characteristic Value Generator," is suitable. In both modes interpolators 34 work under X-Y generator 32 control and in synchronism with the generator such that X, Y, R, G, & B values of each interpolated point are available to the frame buffers simultaneously. Appropriate timing of signals R,G, & B requires a delay circuit 40, which can be readily implemented by those skilled in the art.

Line style generator 36 operates when X-Y generator 32 is in vector generation mode. Generator 36 produces the signal "GAP" to indicate that the current pixel belongs to an active segment of the line or to a gap between segments, i.e., assuming stylized lines are present. Suitable implementations of line style generator 36 are available in the open literature.

Mask buffer & depth buffer unit 38 implements the well known Z-buffer algorithm in a depth buffer in combination with a mask buffer to allow for the shading of polygons. This combination, which enhances the operation of the depth buffer, is central to this invention. The depth buffer is an M ×N memory, usually 16 to 32 bits deep, within which Z values are stored in a way similar to the Z-buffer algorithm. M & N are typically screen dimensions. The mask buffer is also a memory of the same size as the depth buffer but, preferably, only two bits deep. Both buffers are addressed by the X & Y coordinates output from X-Y generator 32.

Figure 4:
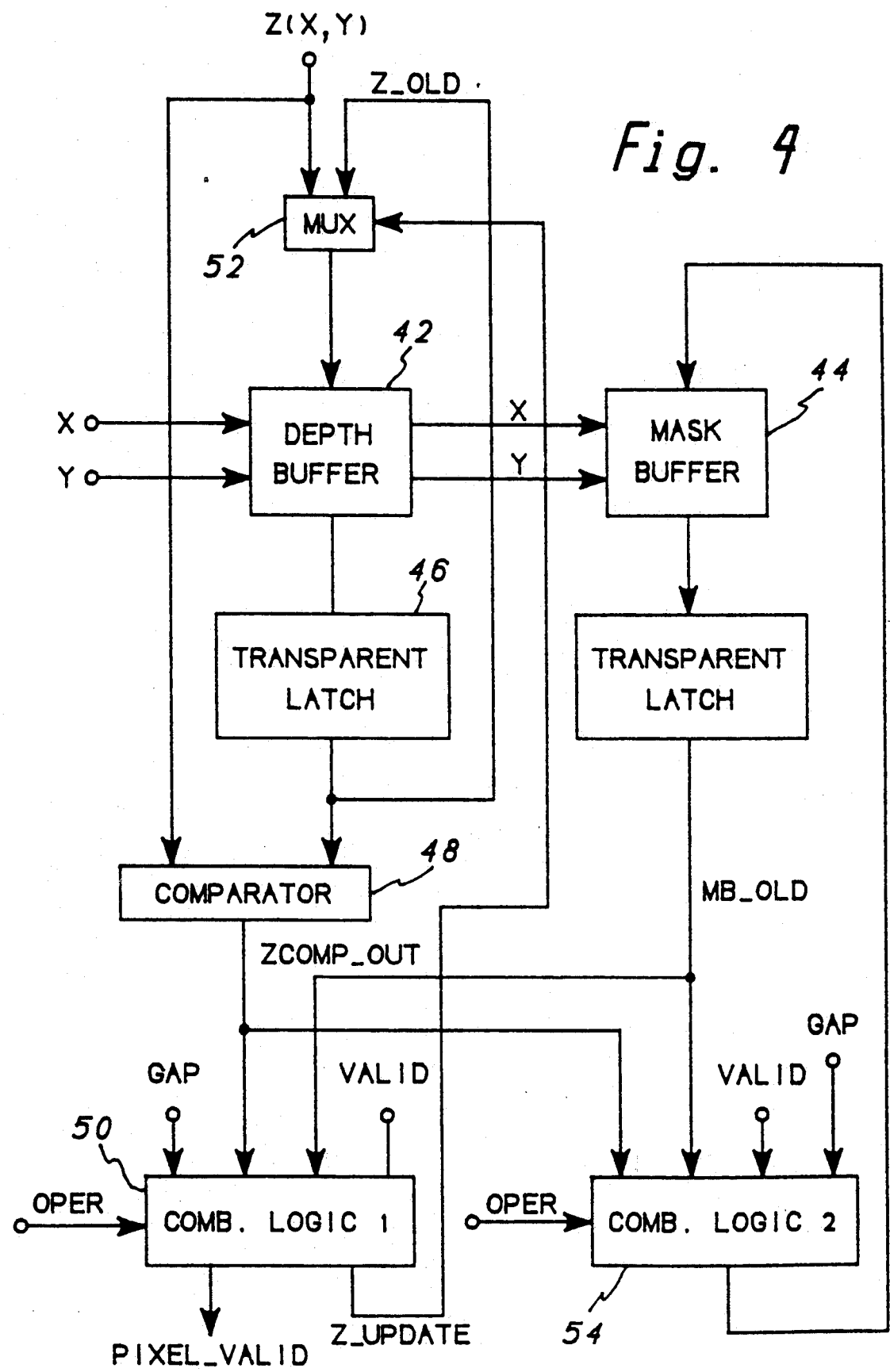
FIG. 4 is a block diagram representation of the mask & depth buffer unit depicted in FIG. 3.

A more detailed depiction of mask buffer and depth buffer circuit 38 is provided in FIG. 4. X,Y coordinates are fed to both depth buffer 42 and mask buffer 44 to identify the pixel location under process. The Z value at location X,Y is fed from interpolator 34 to a comparator 48 which compares the new value with the content of depth buffer 42 at location X,Y to determine if, for example, $Z(X,Y) \geq Z\_OLD$ for a right-hand coordinate system. A transparent latch 46 is used to temporarily hold Z OLD. The output from comparator 48, ZCOMP_OUT, as well as signals GAP, VALID and the contents of the corresponding location X,Y of mask buffer 44 (MB_OLD) are used to generate the signals PIXEL_VALID and Z_UPDATE via a first combinational logic circuit 50. PIXEL_VALID is used to signal the frame buffer (FIG. 2) that the current pixel is valid and should be accepted. Z_UPDATE indicates that the new Z value, should replace the old content of the depth buffer at that location. The signal is fed to a multiplexer 52 for directing this election between $Z(X,Y)$ and Z_OLD.

In a similar manner, the content (MB_OLD) of mask buffer 44 at location X,Y (via a transparent latch 65) and the signals VALID, GAP and ZCOMP_OUT are used in a second combinational logic circuit 54 to generate the mask buffer value intended to replace the content of mask buffer 44 at location X,Y. The nature of mask buffer 44 is explained further below. Signals OPER are control signals to the combinational logic circuit 50 & 54 to enable the operation of the shading algorithm and to identify its different steps (described below).

Pursuant to this embodiment of the invention, the two bit plane mask buffer 44 allows storing of one of three different values at each location. These mask values are labeled as:

'O': initial condition, cleared pixel
 'g': edge gap pixel
 'e': edge segment pixel Combinational logic circuit 54 implements a logical operation (symbolized by '■' in the following algorithm description) between two input values: the content of the mask buffer (i.e., MB_OLD) and some other value as specified by the algorithm. Truth Table 1 identifies the value to be stored into mask buffer 44 to replace MB_OLD.

TABLE 1

| Input | | Output |
|---|---|---|
| '0' | '0' | '0' |
| '0' | 'g' | 'g' |
| '0' | 'e' | 'e' |
| 'g' | '0' | 'g' |
| 'g' | 'g' | 'g' |
| 'g' | 'e' | 'e' |
| 'e' | '0' | 'e' |
| 'e' | 'g' | 'e' |
| 'e' | 'e' | 'e' |

With inspection of Table 1, it should be observed that the '■' operation as commutative and that the value 'e' higher priority in that it appears at the output if the signal appears on any of the inputs. This simply means that edge segment pixels are given priority over edge gap signals. As will be apparent from the following discussion, the operation '■' on mask buffer 44 is designed to preserve the polygon boundary pixels over any interior pixel and the edge segment pixels over the edge gap pixels. One implementing algorithm of this invention will now be presented.

Again, the appropriate processing steps are identified by the OPER signal from generator 32. The algorithm assumes that as initial condition the pixels of the mask buffer are initialized to value '0'. In addition, for each screen to be processed, the pixels of the depth buffer are initialized to a value corresponding to the farthest Z value. Each step involves a separate pass of data through the rendering pipeline.

Step 1: The purpose of this step is to initially mask the boundary of the polygon in the mask buffer so that it will be preserved in subsequent processing. Again, edges can be stylized. The edge "segment" pixels are drawn with the edge color. The edge "gap" pixels are not drawn in the frame buffer and will subsequently be assigned the interior color. X-Y generator 32 and interpolators 34 are set in vector mode to generate the polygon edges. For each pixel on the edge of the polygon, the operation of the mask buffer, depth buffer, and frame buffer depends upon the output of the line style generator 36 as follows:

Line style gap pixel:
   Mask buffer:
      If ZCOMP_OUT = 'true' (e.g., $Z(X,Y) \geq ZB\_OLD$)
      Then MB ← 'g' ■ MB_OLD
   Depth buffer:
      If (ZCOMP_OUT = 'true' & MB_OLD ≠ 'e')
      Then DB ← Z (X,Y)
   Frame buffer:
      No change.
Line style segment pixel:
   Mask buffer:
      If (ZCOMP_OUT = 'true' or MB_OLD = 'g')
      Then MB ← 'e'
   Depth buffer
      If (ZCOMP_OUT = 'true' or MB_OLD = 'g')
      Then DB ← Z(X,Y)
   Frame buffer:
      If (ZCOMP_OUT = 'true' or MB_OLD = 'g')
      Then FB ← R,G,B at (X,Y).

Again, the '■' operation is defined in Table 1. The above algorithms are standard Boolean operations which can be carried out by those skilled in the art. Depth buffer and frame buffer processing are implemented in combinational logic circuit 50 and mask buffer processing resides in combinational logic circuit 54. From the above algorithms it can be observed that if the point under process comprises an edge gap pixel and the Z value, for example, is greater than or equal to the depth buffer value stored at X,Y, then the mask buffer is assigned a value 'g' unless the mask buffer already holds the value 'e' from previous point processing. Also note that edge segment pixels and edge gap pixels are drawn into the mask buffer, visible Z(X,Y) values are assigned to the depth buffer, and if the depth buffer indicates that Z(X,Y) is a visible edge segment pixel (i.e , ZCOMP_OUT='true') then the colors R,G,B at (X,Y) are assigned to the frame buffer, all simultaneously.

Figure 5:
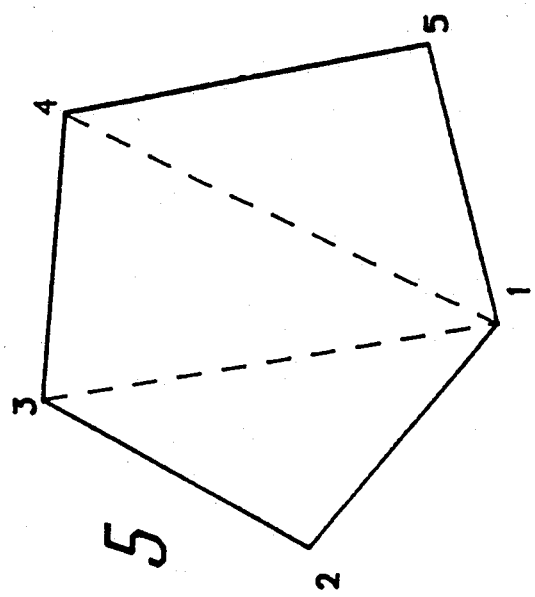
FIG. 5 depicts a convex polygon to be processed according to the present invention.
Figure 1:
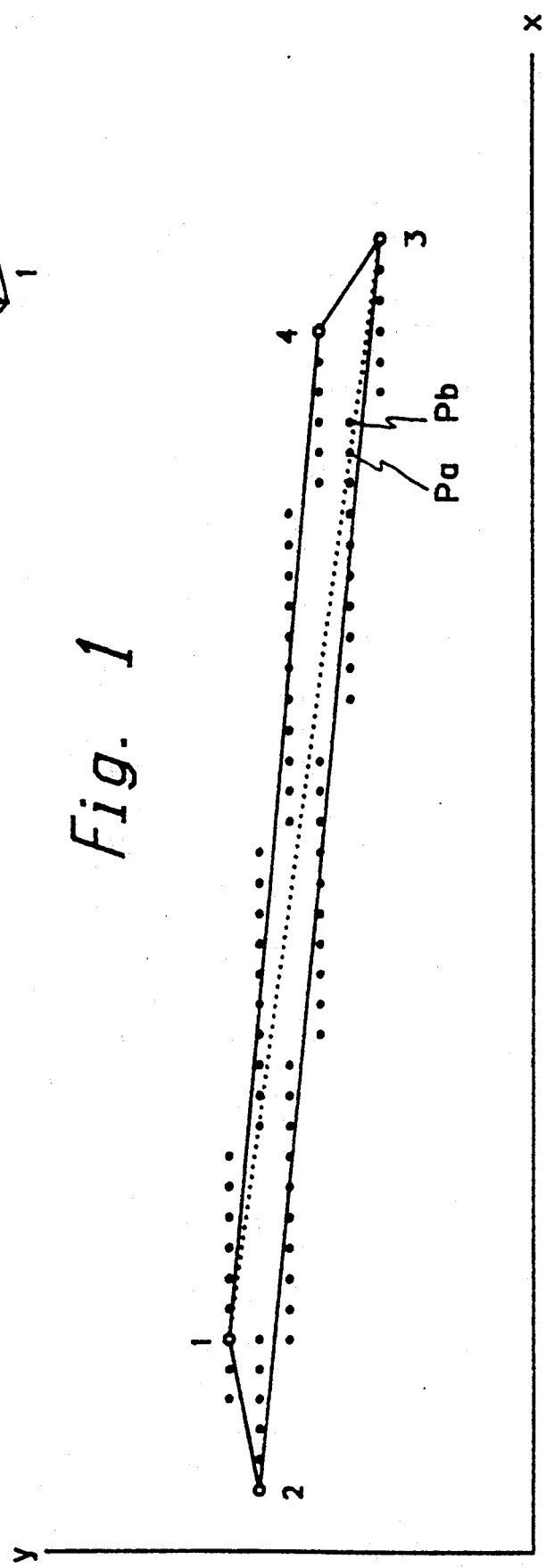
FIG. 1 is a geometrical representation of the pixels in a display polygon.

Step 2: The purpose of this step is to draw the interior points of the polygon in the depth buffer and the frame buffer with reference to or under the control of the mask buffer. To accomplish this, the X-Y generator and the interpolators are set to triangle generation mode. If P1, P2, ..., PN are the vertices of the polygon, then the controller instructs the X-Y generator and the interpolators to generate triangles, P1P2P3, P1P3P4, ... P1(PN1)PN. For example, FIG. 5 depicts a convex polygon. Triangle 1,2,3 is generated first, then triangle 1,3,4 and, finally, triangle 1,4,5. The operation of the buffers in this step can be explained as:

```
Mask buffer:
   No Change
Depth buffer:
   If (ZCOMP_OUT = 'true' & MB_OLD = '0')
   Then DB ← Z(X,Y)
Frame buffer:
   If (ZCOMP_OUT = 'true' & MB_OLD = '0')
   Then FB ← R,G,B at (X,Y).
```

Step 3: The function of this step is to draw the gap points of a stylized polygon boundary, again under the control of the mask buffer (i.e., points with value 'g'). The X-Y generator and interpolators are set in vector mode to generate the polygon edge points. The operations of the buffers are expressed as:

```
Mask buffer:
   No change
Depth buffer:
   If(ZCOMP_OUT = 'true' & MB_OLD = 'g')
   Then DB ← Z(X,Y)
Frame buffer:
   If (ZCOMP_OUT = 'true' & MB_OLD = 'g')
   Then FB ← R,G,B at (X,Y).
```

Step 4: The purpose of this step is to clear the mask buffer subsequent processing of the polygon. The X-Y generator is set in vector mode to generate the polygon boundary. The operations of the buffers in this step are:

```
Mask buffer:
   MB ← '0'
Depth buffer & frame buffer:
   No change.
```

It will be observed from the above that this invention fully meets the objectives set forth herein. A computer graphics display system method and processor have been described which are capable of processing 'polygon with edge'-type primitives using a basic set of hard-wired primitives consisting of vectors and triangles. Further, such a method and processor advantageously use many hardware components standard in typical graphics display systems and have improved cost-performance characteristics over known techniques for processing such primitives.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, the method and processor can process polygonal primitives wherein the boundary and interior colors are the same or wherein the polygon boundary edge is not styled. Other changes will suggest themselves to those skilled in the art. The following claims are intended to encompass all such modifications.

What is claimed is:

1. A display processor for a computer graphics display system having display means including a frame buffer for storing individual pixels for each of a plurality of lines to be displayed on a display monitor, said frame buffer being organized into an M×N plurality of addressable constituent pixels, said display processor being capable of drawing in said frame buffer a 'polygon with edge'-type primitive, said display processor comprising:

a controller;

a X-Y generator having an edge generation mode and a triangle generation mode;

interpolating means configured to receive signals from said controller and said X-Y generator and output interpolated values of Z and intensity for each X,Y address;

mask buffer and depth buffer means including a mask buffer having an M×N plurality of addressable constituent pixels, said mask buffer pixels being two bits deep, and a depth buffer organized into an M×N plurality of addressable constituent pixels; and said mask buffer and depth buffer means including combination logic for generating an accurate mask of said polygon boundary in said mask buffer, said mask being used by the processor to control storing of interpolates Z values and intensity for each X,Y address to the frame buffer.

2. In a computer graphics display system having a display processor and display means including a frame buffer for storing individual pixels for each of a plurality of lines to be displayed on a display monitor, said frame buffer being organized into an M×N plurality of addressable constituent pixels, an improved method for drawing a 'polygon with edge'-type primitive in said frame buffer, said method using a mask buffer organized into an M×N plurality of addressable constituent pixels, said method comprising the steps of:

(a) masking pixels in said mask buffer corresponding to the boundary of said polygon so as to distinguish said boundary pixels from other pixels of said polygon;

(b) drawing said boundary pixels in said frame buffer;

(c) generating pixels corresponding to the interior of said polygon, at least some of said interior pixels corresponding to said masked pixels in said mask buffer; and (d) drawing said interior pixels in said frame buffer in accordance with the content of said mask buffer so as to inhibit the drawing of said interior pixels corresponding to masked pixels in said mask buffer.

3. The method of claim 2, further comprising the step of clearing the pixels in said mask buffer subsequent to drawing said polygon in said frame buffer.

4. The method of claim 2, wherein said generating step (c) comprises the steps of:
  (1) tessellating said polygon into a set of triangles; and
  (2) generating the pixels corresponding to the interior of each of said triangles.

5. The method of claim 2, wherein said display processor includes a depth buffer for storing Z values for individual pixels, said depth buffer being organized into an M×N plurality of addressable constituent pixels, said method further comprising the step of:
  (e) storing Z values for said interior pixels in said depth buffer in accordance with the content of said mask buffer so as to inhibit the storing of depth values of interior pixels corresponding to masked pixels in said mask buffer.

6. The method of claim 5, further comprising the step of storing Z values for said boundary pixels in said depth buffer.

7. In a computer graphics display system having a display processor and display means including a frame buffer for storing individual pixels for each of a plurality of lines to be displayed on a display monitor and a depth buffer for storing Z values of individual pixels, said frame buffer and said depth buffer each being organized into a M×N plurality of addressable constituent pixels, an improved method for drawing a 'polygon with edge'-type primitive in said frame buffer, said method using a mask buffer organized into an M×N plurality of addressable constituent pixels, said method comprising the steps of:
  (a) masking the pixels in said mask buffer corresponding to the boundary of said polygon so as to distinguish said boundary pixels from other pixels of said polygon;
  (b) storing Z values for pixels in said depth buffer corresponding to the boundary of said polygon;
  (c) drawing the pixels in said frame buffer and storing Z values of pixels in said depth buffer corresponding to interior points of said polygon, said frame buffer drawing and said depth buffer storing being made in accordance with the content of said mask buffer so as to inhibit the storing of depth values or drawing of interior pixels corresponding to masked pixels in said mask buffer.

8. The method of claim 7, wherein steps (a)–(c) are performed on a first pass and step (d) is performed on a second pass.

9. In a computer graphics display system having a display processor and display means which includes a frame buffer for storing individual pixels for each of a plurality of lines to be displayed on a display monitor and a depth buffer for storing Z values of individual pixels, said frame buffer and said depth buffer each being organized into a M×N plurality of addressable constituent pixels, an improved method for shading a polygon, with or without a styled boundary defined by edge gaps and edge segments, said method using a mask buffer organized into an M×N plurality of addressable constituent pixels, said method comprising the steps of:
  (a) masking the pixels in said mask buffer corresponding to the edge gaps and edge segments definitive of said polygon boundary so as to distinguish said boundary pixels from other pixels of said polygon;
  (b) storing Z values of pixels in said depth buffer corresponding to the edge gaps and edge segments definitive of said polygon boundary;
  (c) drawing the pixels in said frame buffer corresponding to the edge segments of said polygon boundary, said depth buffer storing and said frame buffer drawing being made in accordance with the content of said mask buffer;
  (d) drawing the pixels in said frame buffer and storing Z values of pixels in said depth buffer corresponding to interior points of said polygon, said frame buffer drawing and said depth buffer storing being made in accordance with the content of said mask buffer so as to inhibit the storing of depth values or drawing of interior pixels corresponding to masked pixels in said mask buffer; and
  (e) drawing the pixels in said frame buffer corresponding to the edge gaps of said polygon boundary, said drawing of gap pixels in said frame buffer being made in accordance with the content of said mask buffer.

10. The method of claim 9, wherein steps (a)–(c) are performed on a first pass, step (d) is performed on a second pass, and step (e) is performed on a third pass.

* * * * *